United States Patent [19]

Körte

[11] Patent Number: 5,112,940
[45] Date of Patent: May 12, 1992

[54] POLYETHERESTERS, THEIR PRODUCTION AND USE

[75] Inventor: Klaus Körte, Ettingen, Switzerland

[73] Assignee: Sandoz Ltd., Basel, Switzerland

[21] Appl. No.: 715,938

[22] Filed: Jun. 14, 1991

[30] Foreign Application Priority Data

Jun. 18, 1990 [DE] Fed. Rep. of Germany ....... 4019412

[51] Int. Cl.$^5$ .......................................... C08G 63/672
[52] U.S. Cl. ................................................... 528/301
[58] Field of Search ........................................ 528/301

[56] References Cited

U.S. PATENT DOCUMENTS 4,537,596 8/1985 Hüller et al. ......................... 528/301

FOREIGN PATENT DOCUMENTS 1-256520 10/1989 Japan ................................ 528/301

Primary Examiner—Paul R. Michl
Assistant Examiner—Yong S. Lee
Attorney, Agent, or Firm—Gerald D. Sharkin; Richard E. Vila; Thomas C. Doyle

[57] ABSTRACT

Polyetheresters (P) of average molecular weight $\overline{M}_w$ in the range of 1200 to 500,000, which are obtainable by polycondensation of the starting materials indicated in the claims, are suitable at finishing agents for fibrous material to which they confer hydrophilic and also antistatic and anti-soiling properties; they may be formulated to storage-stable liquid compositions.

20 Claims, No Drawings

POLYETHERESTERS, THEIR PRODUCTION AND USE

It has been found that certain novel polyetheresters, as defined below as (P), are particularly well suitable as finishing agents in order to achieve highly hydrophilic and anti-soiling permanent finishings.

The invention relates to the novel products, their production and their use as well as to their compositions.

The invention thus provides (P) a polyetherester or polyetherester mixture of average molecular weight e,ovs/M/ $_w$ in the range of 1200 to 500,000, obtainable by α) copolycondensation of (A) at least one acid of formula $$HOOC-R_1-COOH \quad (I).$$

in which $R_1$ signifies a bivalent hydrocarbon radical with 1 to 8 carbon atoms, or a functional derivative thereof with (B) at least one diol of formula $$\begin{array}{c} HO-Z-OH \\ | \\ X-R_2-COOM \end{array} \quad (II)$$

wherein

X signifies —O—, —CO— or a direct bond,

Z signifies an aliphatic hydrocarbon radical with 3 to 6 carbon atoms which is either unsubstituted or is substituted by a further hydroxy group or a phosphonic acid group, and, if X signifies —CO—, is optionally interrupted by a nitrogen bound to this CO—group or is optionally bound to this CO—group through an —NH—group, $R_2$ signifies a bivalent aliphatic hydrocarbon radical with 1 to 4 carbon atoms or, if $X \neq$ —O—, also the direct bond to X, and M signifies a cation and the group Z contains at least two carbon atoms of distance between the two hydroxy groups to which it is bound, with the proviso that the group $$-R_2-X-Z\begin{array}{c}/\\\backslash\end{array} \quad (III)$$

contains at least one heteroatom, and (C) ethyleneglycol to a polymer (P') and capping the end groups of (P') at least in part with (D) at least one polyethyleneglycolmonoalkylether of the formula $$R_3{-}O{-}CH_2{-}CH_2{\overline{]_m}}OH \quad (IV),$$

in which $R_3$ signifies $C_{1-6}$-alkyl and m signifies on average a number from 5 to 120 or

β)

polycondensation of (A) with (C) to a prepolymer $(P_1)$, polycondensation of (A) with (B) to a prepolymer $(P_2)$, polycondensation of $(P_1)$ with $(P_2)$ to a polymer $(P_3)$ and at least partially capping the end groups of $(P_3)$ with (D).

The radical $R_1$ may be aliphatic or, if it contains 6 or more carbon atoms, also aromatic. Suitable dicarboxylic acids of formula (I) include: malonic acid, succinic acid, fumaric acid, maleic acid, glutaric acid, adipic acid, pimelic acid, suberic acid and optionally methyl-substituted phthalic acid, in particular phthalic acid, isophthalic acid and terephthalic acid. Preferably $R_1$ contains 4 to 6 carbon atoms; among the dicarboxylic acids of formula (I) terephthalic acid is preferred. As functional derivatives of the dicarboxylic acids of formula (I) come into consideration advantageously their halides (in particular chloride) and preferably their esters (in particular diethylester and, before all, dimethylester).

The compounds of formula (II) contain at least one heteroatom in the group of formula (III). As heteroatom in (III) there is contained preferably at least one oxygen atom, principally as —O— or —CO— in the significance of X or as a further substituent in Z (inparticular as —OH); besides oxygen there is optionally contained in (III) a further heteroatom which is advantageously a phosphorus or nitrogen atom (in particular as a phosphonic acid group as a substituent in Z or as an amide group in —X—Z=). Preferably a carbonyl group X is bound to a nitrogen in Z to form an amide group or Z is bound through an —NH—group to a carbonyl group X to form an amide group. Z preferably contains 3 to 4 carbon atoms. $R_2$ advantageously contains 0 to 3, most preferably 2 carbon atoms.

The compounds of formula (II) may be synthetised in a manner known per se. Those in which X signifies a carbonyl group bound to a nitrogen atom can be produced in particular by unilateral amidation of corresponding dicarboxylic acids or of functional derivatives of such dicarboxylic acids (principally of the anhydrides) with corresponding aminodiols. Suitable dicarboxylic acids HOOC—$R_2$—COOH are, in particular, the following; oxalic acid, malonic acid, succinic acid, maleic acid, glutaric acid and adipic acid, among which the alkane dicarboxylic acids, before all succinic acid, are preferred. Suitable aminodiols are, in particular, diethanolamine, diisopropanolamine and 2-amino-2-hydroxymethyl-1,3-propanediol. The compounds of formula (II) in which X signifies oxygen can be produced in particular by reaction of corresponding hydroxy carboxylic acids (preferably lactic acid) or of their nitriles or esters, with corresponding compounds leading to the —Z(OH)$_2$ group, preferably epichlorohydrin, methylepichlorohydrin or glycidol, and, if there has been employed an acid nitrile or ester, saponification of the nitrile or ester group to the acid group, respectively if there has been employed an epichlorohydrin, hydrolytic splitting off of the chlorine, or they can be produced by addition of a suitable compound of formula HO—Z(OH)$_2$, e.g. glycidol, to an unsaturated acid, an unsaturated acid nitrile or an unsaturated acid ester, such as in particular acrylic or methacrylic acid nitrile and acrylic or methacrylic acid or their methyl or ethyl esters and, if there has been employed an acid nitrile or ester, saponification of the nitrile or ester group to the carboxy group. The compounds of formula (II) may also be methylolation products of corresponding carboxylic acids containing active methylene groups, in particular as are obtainable by methylolation of the respective $C_{1-4}$-alkylesters, preferably of carboxymethylphosphonic acid triethylester or of pyruvic acid (ester), with formaldehyde under alkaline conditions and saponification of the ester groups.

Preferably Z bears no further substituents. With particular preference Z is an aliphatic hydrocarbon radical with 3 to 6, preferably 3 or 4 carbon atoms, which, if X signifies the carbonyl group, is either interrupted by a nitrogen bound to this carbonyl group or is bound through an —NH—group to this carbonyl group. Preferably also between each of the two hydroxy groups and X in the compounds of formula (II) there is a distance of 2 or 3 carbon atoms.

The radical $R_3$ may be any alkyl radical with 1 to 4 carbon atoms namely methyl, ethyl, n-propyl, isopropyl, n-butyl, isobutyl, sec.butyl or tert.-butyl, among which the lower molecular representatives are preferred, in particular methyl. The index m represents an average value which is advantageously in the range of 10 to 50, preferably 12 to 30.

The polyetheresters (P) of the invention have advantageously an average molecular weight $\overline{M}_w$ in the range of 1200 to 200,000, preferably 1500 to 100,000, in particular 1500 to 50,000. The process for the production of the polyesters (P) of the invention is characterized by the above defined process alternatives ($\alpha$) or ($\beta$).

According to process variant ($\alpha$) it is for instance possible to bring to reaction all of (A), (B) and (C) together or it is e.g. possible to first react (A) with (B) and optionally a portion of the totally required ethyleneglycol (C) and then further reacting the precondensate with the remaining ethyleneglycol (C). Preferably all of the ester-forming components [i.e. (A), (B) and (C)] are reacted with each other to (P') in one operation. According to process variant ($\alpha$) there are, thus, obtainable mainly polyesters (P') respectively polyetheresters (P) with statistically distributed monomeric units, whereas according to process variant ($\beta$) there are formed mainly polyesters ($P_3$) respectively polyetheresters (P) with block polymer units from the polycondensation of ($P_1$) with ($P_2$).

The molar ratio of the totally empoloyed compounds (A) to the totally employed hydroxycompounds (B) and (C) is suitably selected so that a polycondensate of $\overline{M}_w$ in the indicated range may be formed upon reaction with (D). The compounds (A) are advantageously employed in excess over the equimolar amount of (B). The molar ratio of the totally employed compounds (A) to the totally employed compounds (B) [as well for process variant ($\alpha$) as for process variant ($\beta$)] is advantageously in the range of 100:1 to 4:1, preferably in the range of 50:1 to 8:1, in particular in the range of 25:1 to 10:1.

The ethyleneglycol (C) may also be employed in excess as it can serve as a solvent and after completion of the polymerisation up to the desired molecular weight, the remaining ethyleneglycol may be recovered, e.g. by distillation. The polycondensation is advantageously carried out at temperatures in the range of 110° to 240° C., preferably 140° to 210° C., suitably under inert atmosphere (advantageously under a nitrogen or carbon dioxide blanket) and a catalyst may advantageously be added in order to accelerate the polycondensation. There may be employed in particular zinc, manganese, cobalt, antimony, germanium, titanium or tin compounds, conventionally employed as polycondensation catalysts, in particular tin-II-chloride, antimony sesquioxide, antimony trichloride, antimony triacetate, germanium dioxide, germanium tetrachloride, tetraalkyltitanic acid ester and, with particular preference, manganese diacetate.

The reaction of (P') or ($P_3$) with the polyethyleneglycolmonoalkylethers of formula (IV) may be carried out in the same reactional sequence, in particular in the presence of the same catalysts and preferably in the same temperature range. Upon completion of the whole polycondensation and capping reactions the residual ethyleneglycol may be distilled off, preferably under reduced pressure. According to a particularly preferred procedure the compounds (B) are produced in the same reactional sequence, which is of particular advantage if the compounds of formula (II) contain as X a carbonyl group which is linked to a nitrogen atom to form a carbamoyl group. In this case it is of advantage to treat the aminodiol (preferably a dialkanolamine; in particular diethanolamine) in admixture with ethyleneglycol with the anhydride of a dicarboxylic acid of formula $HOOC-R_2-COOH$ (preferably succinic acid), and after completion of the amidation and salt formation by addition of a base for the introduction of a cation M, to add at least one acid of formula (I) or a functional derivative thereof and to carry out the polycondensation as described above, after which the polycondensate may be reacted with at least one polyethyleneglycolmonoalkylether of formula (IV). This way of proceeding is particularly preferred if, as a compound (B) there is employed a salt of N,N-di-($\beta$-hydroxyethyl)-succinic acid monoamide.

Any conventional bases may be employed for salt formation in order to introduce the cations M, principally alkali metal hydroxides or magnesium oxides among which the alkali metal hydroxides (in particular lithium, sodium or potassium hydroxide) are preferred.

The polyetheresters (P) of the invention are essentially of linear structure and may in particular be indicated as being characterized by a content of recurring units of formula

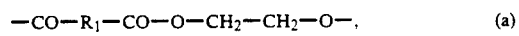

and

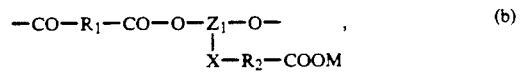

in which $Z_1$ signifies an aliphatic hydrocarbon radical with 3 to 6 carbon atoms, which optionally bears a hydroxy or phosphonic acid group or a further O—bound branching of formula $-O-CO-R_1-CO-$ as a substituent and which, if X signifies —CO— is optionally interrupted by a nitrogen bound to this CO—group or optionally is bound to this CO—group over an —NH—group, and the group $Z_1$ contains a distance of at least two carbon atoms between the two —O— to which it is bound,
and end groups of formula

which either are bound to —O— or are bound to —CO— through an —O—.

The synthetised polyetheresters (P) may be employed directly as they have been produced or may preferably be processed to aqueous compositions and a further object of the invention are aqueous compositions which are characterized by a content of polyetheresters (P) as described above. The aqueous compositions may be produced by plain stirring of the polyetheresters into water, preferably at elevated temperature, in particular at melt temperature of the polyester (in general in the temperature range of 60° to 100° C.). Preferably there is added an emulsifier (E), in particular a non-ionogenic emulsifier with an HLB-value≧4, in particular in the range of 8 to 18. As non-ionogenic emulsifers (E) come advantageously into consideration araliphatic or aliphatic polyalkyleneglycolmonoethers, principally polyethyleneglycolmonoethers of higher fatty alcohols or alkylphenols, in particular with 9 to 22, preferably 12 to 20 carbon atoms in the alkylphenyl radical or in the fatty radical and which contain in the polyethylenegylcol chain preferably 2 to 30 ethyleneoxy units, in particular 5 to 20 ethyleneoxy units, or further optionally oxyethylated sorbitane monoethers of the above mentioned fatty alcohols. Among the derivatives mentioned above the fatty alcohol derivatives are preferred.

Per 100 parts by weight of polyetherester (P) there are employed preferably 2 to 100, in particular 5 to 50 parts by weight of the nonionic emulsifier (E). The mentioned aqueous compositions containing polyetherester (P) and optionally nonionic emulsifier (E) have preferably a dry substance content of 1 to 40% by weight, preferably of 1 to 35% by weight. They are distinguished by an outstanding storage stability.

The polyetheresters (P) of the invention, particularly also in the form of their above mentioned compositions, serve as finishing agents for various textile or non-textile substrates, principally for hydrophobic fibrous materials, before all of substrates comprising synthetic fibrous materials, especially polyester, polyamide, polyacrylonitrile, polyurethane and/or cellulose acetate fibrous material. The products of the invention are employed, in particular, for the conclusive finishing of optionally already dyed or optically brightened material before and or even after having been ready-made. The substrates may be in any processing stage, e.g. as loose fibres, filaments, yarns, skeins, spools, woven or knitted goods, non-wovens, felts, carpets, tuftings and half-ready or even ready made goods. The finishing is preferably carried out by impregnation processes from aqueous liquor (e.g. in the pH range of from 3.5 to 8.5, preferably 5 to 8), e.g. by padding, dipping, spraying, foam application or treatment of the goods in a drum from short liquor or by forcing of the liquor through cross-wound spools, and subsequent drying and optionally fixation at elevated temperature, e.g. in the temperature range of 102° to 220° C., depending on the employed substrates, in particular by steaming, e.g. in the temperature range of 102° to 115° C., by drying at 102° to 160° C. or by thermosoling at 150° to 220° C. Optionally the finishing with the polyetheresters (P) of the invention may be combined with a synthetic resin finishing, e.g. for cellulosic fibrous material.

By the finishing of the invention there may be achieved an outstanding hydrophilicity of the substrate with excellent permanence and anti-soiling (in particular soil-releasing and anti-redeposition) properties. The further use of an antistatic agent becomes unnecessary since the polyetheresters (P) of the invention confer to the substrate also very good antistatic properties. The products of the invention are furthermore excellently compatible with dyes and optical brighteners so that the respective dyeings and optical brightenings are practically not impaired.

In the following Examples parts and percentages are by weight, the temperatures are indicated in degrees Celsius; 1 mm Hg≃1,333 mbar.

EXAMPLE 1

45 g of succinic acid anhydride and 47.2 g of diethanolamine are dissolved in 1120 g of ethyleneglycol and stirred during 5 hours at 60° C. 24 g of potassium hydroxide are then dissolved in the reaction melt, 1164 g of terephthalic acid dimethylester and 2.5 g of manganese-II-acetate tetrahydrate are then added and the mixture is heated under a smooth nitrogen stream to 180° C. during 5-6 hours. Methanol begins to distill off at about 110° C. After cooling to 120° C. 2250 g of polyethylenegylcol-750-monomethylether are added, a vacuum of 20 mm Hg is applied and the mixture is heated again to 180° C. and the residual ethyleneglycol still present as allowed to distill off during 3 hours. There are obtained 3380 g of solid product.

EXAMPLE 1bis

Example 1 is repeated with the difference that in place of 45 g of succinic acid anhydride there are employed 44.2 g of maleic acid anhydride.

EXAMPLE 2 a) 45.0 g of succinic acid anhydride are stirred at 40° C. into 47.4 g of diethanolamine during 1 hour by which the temperature rises to about 70° C. Stirring is continued for further 2 hours at 80° C. 92.6 g of ethyleneglycol are added by which there are obtained 185 g of a 50% solution of mono-[N,N-di-(2'-hydroxyethyl)]-succinic acid monoamide in ethyleneglycol.

b) 185 g of the solution produced according to Example 2a, 992 g of ethyleneglycol and 24 g of potassium hydroxide are admixed with stirring during 30 minutes at ambient temperature. 1164 g of terephthalic acid dimethylester and 2.3 g of manganese-II-acetate are then added and the mixture is heated under a nitrogen blanket during 5-6 hours to 180° C. Methanol begins to distill off at about 110° C. After cooling to 120° C., 2250 g of polyethyleneglycol-750-monomethylether are added, a vacuum of 20 mm Hg is applied and the mixture is heated again to 180° C. and the ethyleneglycol in excess is allowed to distill off during 3 hours. There are obtained 3380 g of solid product.

EXAMPLES 2.1 to 2.6

Polymers with further diols of formula (II) are produced analogously to Example 2b by replacing the diol of Example 2a by the equivalent amount of the following diols of formula (II):

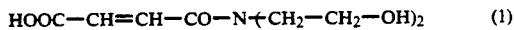 (1)

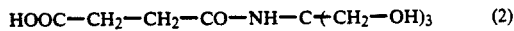 (2)

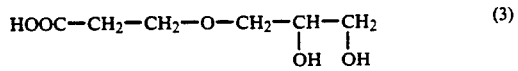 (3)

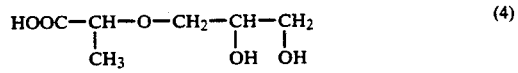 (4)

-continued

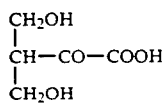  (5)

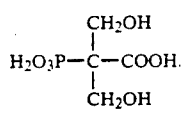  (6)

EXAMPLE 3

[Synthesis of 2-(2',3'-dihydroxypropoxy)-propionic acid]

177 g of lactic acid ethylester and 46.2 g of epichlorohydrin are admixed by stirring in the presence of 0.5 ml of borontrifluorideetherate during 4 hours at 80° C. The excess of lactic acid ethyl ester is then distilled off with vacuum (20 mm Hg). The residue is dehalogenated and saponified with diluted sodiumhydroxide.

EXAMPLE 4

[Production of an aqueous dispersion]

25 g of decaethyleneglycolmonooleylether and 100 g of the substance produced according to Example 1 are stirred into 375 g of water at 60° C. during 4 hours. Stirring is then continued for further 10 hours at ambient temperature. There are obtained 500 g of a storage stable white dispersion.

In an analogous way the products of Examples 1bis, 2 and 2.1 to 2.6 are used to form stable dispersions.

APPLICATION EXAMPLE A

Knitted goods of polyethyleneglycolterephthalate of a square meter weight of 128 g is treated with an aqueous liquor containing per liter 22 g of the aqueous dispersion described in Example 4. The textile material is dipped into the aqueous liquor and squeezed to a 100% pick-up. It is dried during 90 seconds at 140° C. The so-treated goods have a very good hydrophilization effect which is stable to repeated washings.

APPLICATION EXAMPLES B to I

In an anlogous way there are employed the products of the Examples 1bis, 2 and 2.1 to 2.6 in the form of their dispersions analogously to Example 4.

I claim:

1. A polyetherester or polyetherester mixture (P) with average molecular weight $\overline{M}w$ in the range of 1200 to 500,000 obtainable by α) copolycondensation of (A) at least one acid of formula $$HOOC—R_1—COOH \quad (I),$$

in which
   $R_1$ signifies a bivalent hydrocarbon radical with 1 to 8 carbon atoms,
   or a functional derivative thereof with
   (B) at least one diol of formula

  (II)

wherein

X signifies —O—, —CO— or a direct bond,
Z signifies an aliphatic hydrocarbon radical with 3 to 6 carbon atoms which is either unsubstituted or is substituted by a further hydroxy group or a phosphonic acid group, and, if X signifies —CO—, is optionally interrupted by a nitrogen bound to this CO—group or is optionally bound to this CO—group through an —NH—group,
$R_2$ signifies a bivalent aliphatic hydrocarbon radical with 1 to 4 carbon atoms or if X≠—O—, also the direct bond to X, and
M signifies a cation
and the group Z contains at least two carbon atoms of distance between the two hydroxy groups to which it is bound, with the proviso that the group

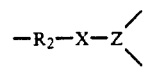  (III)

contains at least one heteroatom and
   (C) ethyleneglycol
   to a polymer (P') and capping the end groups of (P') at least in part with
   (D) at least one polyethyleneglycolmonoalkylether of the formula

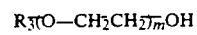  (IV), in which
   $R_3$ signifies $C_{1-6}$-alkyl and
   m signifies on average a number from 5 to 120 or
   β) polycondensation of (A) with (C) to a prepolymer ($P_1$), polycondensation of (A) with (B) to a prepolymer ($P_2$), polycondensation of ($P_1$) with ($P_2$) to a polymer ($P_3$) and at least partially capping of the end groups of ($P_3$) with (D).

2. A polyetherester or polyetherester-mixture (P) according to claim 1 comprising recurring units of formulae

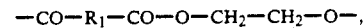  (a)

and

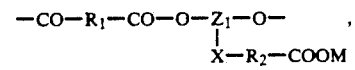  (b)

in which
$Z_1$ signifies an aliphatic hydrocarbon radical with 3 to 6 carbon atoms, which optionally bears a hydroxy or phosphonic acid group or a further O-bound branching of formula —O—CO—$R_1$—CO— as a substituent, and which, if X signifies —CO—, is optionally interrupted by a nitrogen bound to this CO—group or optionally is bound to this CO—group through an —NH—group,
and the group $Z_1$ contains a distance of at least two carbon atoms between the two —O— to which it is bound,
and end groups of formula

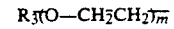  (c), which either are bound to —O— or are bound to —CO— over an —O—.

3. A polyetherester or polyetherester-mixture (P) according to claim 1, wherein
X signifies —CO— and
Z signifies an aliphatic hydrocarbon radical with 3 to 6 carbon atoms which is either interrupted by a nitrogen atom bound to X or is bound to X through an —NH—group.

4. A polyetherester or polyetherester-mixture (P) according to claim 1 wherein $R_1$ signifies phenylene-1,4.

5. A polyetherester or polyetherester-mixture (P) or a mixture thereof according to claim 1, wherein the radical of formula $$-\text{O}-\text{Z}-\text{O}- \atop | \atop \text{X}-\text{R}_2-\text{COOM} \qquad (\text{II}')$$

signifies the radical of a dicarboxylic acid-mono-diolamide in the form of its M-salt.

6. A polyetherester or polyetherester mixture (P) according to claim 5 in which the radical of formula (II') signifies a radical of formula $$-\text{O}-\text{CH}_2-\text{CH}_2-\text{N}-\text{CH}_2-\text{CH}_2-\text{O} \atop | \atop \text{CO}-\text{CH}_2-\text{CH}_2-\text{COOM} \qquad (d)$$

7. An aqueous composition comprising a polyetherester or polyetherester-mixture (P) according to claim 1.

8. A composition according to claim 7 comprising at least one non-ionogenic emulsifier (E) of HLB≧4.

9. A composition according to claim 8 with a dry substance content of 1 to 40% by weight.

10. A polyetherester or polyetherester-mixture according to claim 1 wherein, in formula (IV), $R_3$ is methyl, ethyl, n-propyl, isopropyl, n-butyl, isobutyl, sec.butyl or tert.butyl and m is an average number in the range 10 to 50.

11. A polyetherester or polyetherester-mixture according to claim 10 wherein the molar ratio of totally employed compounds (A) to totally employed compounds (B) is in the range 50:1 to 8:1.

12. A polyetherester or polyetherester mixture according to claim 1 wherein the molar ratio of totally employed compounds (A) to totally employed compounds (B) is in the range 100:1 to 4:1.

13. A polyetherester or polyetherester-mixture according to claim 3 wherein (A) is malonic acid, succinic acid, fumaric acid, maleic acid, glutaric acid, adipic acid, pimelic acid, suberic acid, phthalic acid, isophthalic acid or terephthalic acid or a halide or diethyl- or dimethylester of such an acid.

14. A polyetherester or polyetherester-mixture according to claim 13 wherein, in formula (IV), $R_3$ is methyl, ethyl, n-propyl, isopropyl, n-butyl, isobutyl, sec.butyl or tert.butyl and m is an average number in the range 10 to 50.

15. A polyetherester or polyetherester-mixture according to claim 14 wherein, in formula (II), there is a distance of 2 or 3 carbon atoms between each of the two hydroxy groups and X.

16. A polyetherester or polyetherester-mixture according to claim 15 having an average molecular weight $\overline{M}w$ in the range 1500 to 100,000 and wherein the molar ratio of totally employed compounds (A) to totally employed compounds (B) is in the range 50:1 to 8:1.

17. A polyetherester or polyetherester-mixture according to claim 14 having an average molecular weight $\overline{M}w$ in the range 1500 to 50,000 and wherein the molar ratio of totally employed compounds (A) to totally employed compounds (B) is in the range 25:1 to 10:1.

18. A process for producing a polyetherester or polyetherester-mixture (P) with average molecular weight $\overline{M}w$ in the range of 1200 to 500,000 which comprises
α) copolycondensing
(A) at least one acid of formula $$\text{HOOC}-\text{R}_1\text{COOH} \qquad (\text{I}),$$

in which $R_1$ signifies a bivalent hydrocarbon radical with 1 or 8 carbon atoms,
or a functional derivative thereof
with (B) at least one diol of formula $$\text{HO}-\text{Z}-\text{OH} \atop | \atop \text{X}-\text{R}_2-\text{COOM} \qquad (\text{II})$$

wherein
X signifies —O—, —CO— or a direct bond,
Z signifies an aliphatic hydrocarbon radical with 3 to 6 carbon atoms which is either unsubstituted or is substituted by a further hydroxy group or phosphonic acid group, and, if X signifies —CO—, is optionally interrupted by a nitrogen bound to this CO—group or is optionally bound to this CO—group through an —NH—group,
$R_2$ signifies a bivalent aliphatic hydrocarbon radical with 1 to 4 atoms or, if X≠—O—, also the direct bond to X, and
M signifies a cation
and the group Z contains at least two carbon atoms of distance between the two hydroxy groups to which it is bound, with the proviso that the group $$-\text{R}_2-\text{X}-\text{Z} \diagup \diagdown \qquad (\text{III})$$

contains at least one heteroatom and
(C) ethyleneglycol
to a polymer (P') and capping the end groups of (P') at least in part with
(D) at least one polyethyleneglycolmonoalkylether of the formula $$\text{R}_3\text{O}-(\text{CH}_2\text{CH}_2)_m\text{OH} \qquad (\text{IV}),$$

in which
$R_3$ signifies $C_{1-6}$-alkyl and
m signifies on average a number from 5 to 120 or
β) polycondensing (A) with (C) to a prepolymer ($P_1$), polycondensing (A) with (B) to a prepolymer ($P_2$), polycondensing ($P_1$) with ($P_2$) to a polymer ($P_3$) and at least partially capping the end groups of ($P_3$) with (D).

19. A process according to claim 18 wherein, in the compound of formula II, the radical of formula

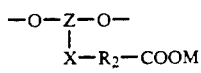

signifies the radical of a dicarboxylic acid-mono-diolamide in the form of its M-salt and said process comprises reacting a mixture of an aminodiol and ethyleneglycol with the anhydride of a dicarboxylic acid HOOC—R$_2$—COOH and a base for the introduction of the cation M and, after amidation and salt formation, adding (A) and effecting the polycondensation with (A) to a polyester (P') and reacting the obtained polyester (P') with (D).

20. A process according to claim 19, wherein the aminodiol is diethanolamine and the anhydride of the dicarboxylic acid is succinic acid anhydride.

* * * * *